UNITED STATES PATENT OFFICE.

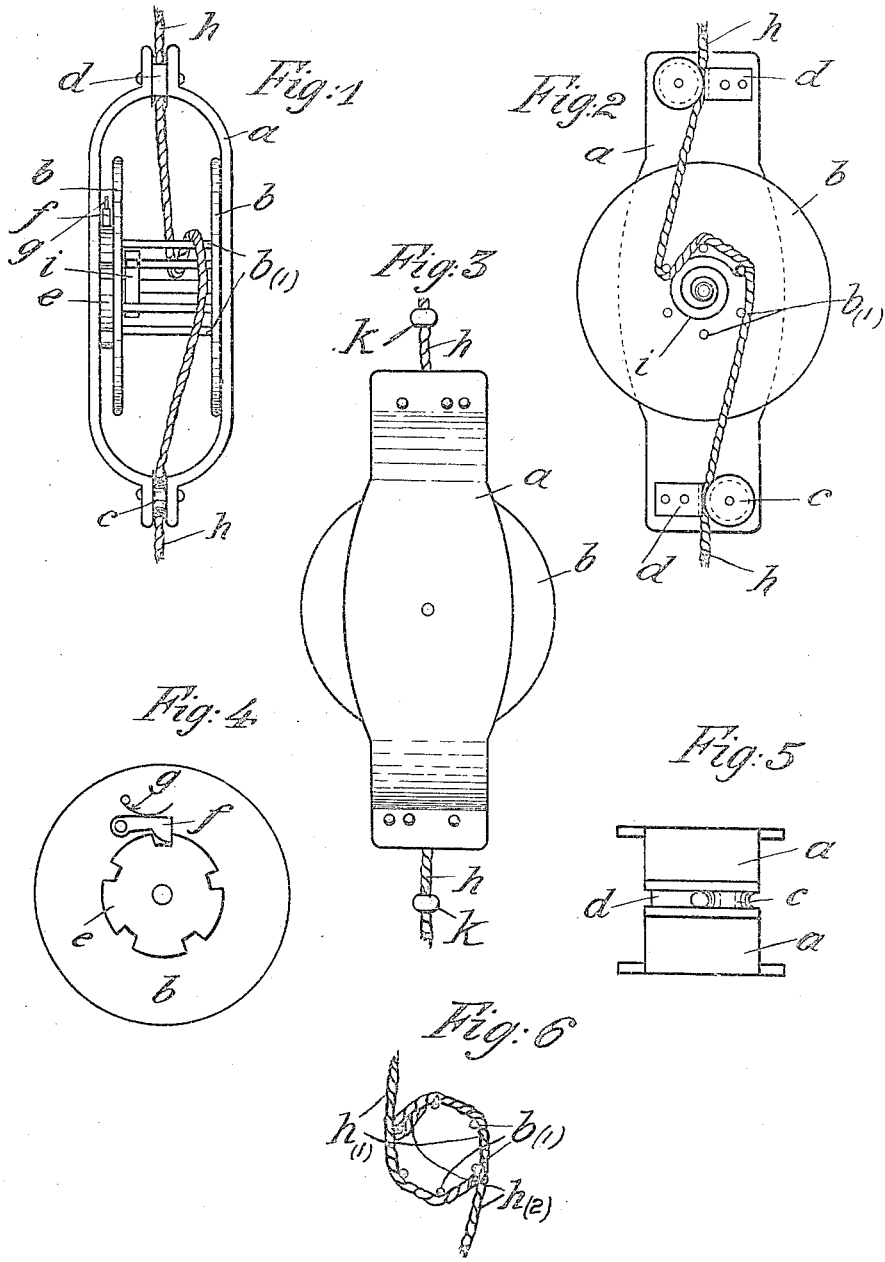

ALEXANDER NESBITT, OF PATERSON, NEW JERSEY.

AUTOMATIC REEL AND LET-OFF FOR ELECTRIC-LIGHTING DEVICES.

1,253,415. Specification of Letters Patent. Patented Jan. 15, 1918.

Application filed November 9, 1916. Serial No. 130,440.

*To all whom it may concern:*

Be it known that I, ALEXANDER NESBITT, a citizen of the United States, residing at Paterson, in the county of Passaic and State of New Jersey, have invented certain new and useful Improvements in Automatic Reels and Let-Offs for Electric-Lighting Devices, of which the following is a specification, reference being had therein to the accompanying drawing.

My invention relates to reels, particularly to a reel upon and from which a strand or strands of wire, cord, or other material may be wound or unwound, automatically and simultaneously in opposite directions; a reel adapted for manufacturing or domestic purposes, and for inside or outside uses.

The objects of my invention are to produce a spring actuated reel, adapted to let off any desired length of wire, cord, or other suitable material, and to automatically take up or wind the same on the reel when desired; to produce a reel that will let off and when desired, automatically wind thereon, a strand or strands of material in tiers or layers, one above the other, so as to lay spirals or layers of material in substantially concentric circles, on the barrel of the reel, the strands in each layer lying substantially parallel, except when crossing to form a new layer upon the one preceding; to produce a roving reel adapted to take up and let off the strands of wire, cord, or other material in different directions simultaneously; to provide a means for automatically checking the delivery of material from the reel when desired, and a means for automatically winding the material on the reel at will, and for simultaneously winding or unwinding the strands in opposite directions.

The strands of material adapted to be wound upon and delivered from the reel may be insulated wire, such as is used in suspended or swinging electric light bulbs.

While my invention may be employed in various uses with good results and economy, it is especially adapted for suspended electric light bulbs or for use in automobiles, owing to the fact that the insulated electric light wire may be wound upon the reel, occupying but little space.

When applied to automobiles or to electric lights, suspended from a ceiling or fixed in various other forms for domestic lighting purposes, the wire may be wound up on the reel when not in use and the reel will take up but little space in a convenient place.

One of the many ways in which the principles of my invention may be applied is shown in the accompanying drawings; but as there may be many modifications in the construction of fixtures for the application of my invention, I do not wish to limit myself to the construction shown, but will hereinafter claim broadly, the spirit or principle so as to cover all that the scope of my invention permits.

The invention consists of a reel which is mounted to revolve in either direction upon a fixed axle secured to a casing which is adapted to substantially inclose the reel proper.

To one head of the reel is secured a ratchet which revolves with the reel upon said fixed axle and is suitably notched to permit a spring actuated pawl, which is pivotally secured to the inside of the casing, to co-act and engage with the notched ratchet, when the speed of the revolving reel is slackened, in order to stop the revolution of the reel, when it is so desired, and prevent the further winding of the wire upon the reel.

The pawl is so shaped and the notches in the ratchet are so shaped that in the unwinding process, the pawl does not interfere with or lock the ratchet and the reel to which it is secured, or prevent the unwinding of the wire from the reel.

A tension spring having one end secured to the fixed axle and its opposite end to the barrel of the reel, is so placed in tension by the delivery of the wire or cord from the reel, that it causes the reel to re-wind the wire or cord upon the barrel of the reel, when the pawl is released from engagement with the ratchet.

Oppositely arranged means for guiding the wire or cord are so located in the casing as to guide the wire or cord in both the winding and unwinding process in opposite directions.

In the accompanying drawings, in which similar letters of reference indicate like parts Figure 1 is a front elevation of one construction embodying my invention; Fig. 2 is a side elevation of a portion of Fig. 1, one side of the casing and one head of the reel being omitted, thus showing a wire or cord unwound from the barrel of the reel, spring placed in tension, and guides through which the wire or cord passes after leaving the barrel of the reel; Fig. 3 is a side view of Fig. 1; Fig. 4 shows a ratchet secured to one head of the reel, and a spring actuated pawl engaging said ratchet; Fig. 5 is an end view of either the top or the bottom of Fig. 3, showing means for guiding the rope, cord, or wire to or from the reel; Fig. 6 is a view showing a section of the barrel portion of the reel and how the wire or cord may be wound or unwound on and from the barrel.

In the drawings ($a$) indicates the casing; ($b$) the heads of the reel; ($c$) and ($d$) are respectively a pulley and a grooved block, oppositely located in the casing, for the purpose of guiding the wire, cord, or other material to and from the barrel of the reel in opposite directions; ($e$) is a ratchet secured to one head of the reel; ($f$), a pawl which is pivotally secured to the casing; ($g$), a spring adapted to engage the pawl ($f$) to force it into engagement with the ratchet ($e$) to stop the revolution of the reel, where and when desired; ($h$) the cord, wire or other material, which is secured midway its length, in any suitable manner, to the barrel of the reel, so that in winding, the material is wound on to the reel from different directions, and in unwinding, the material is delivered in different directions; ($i$) is a spiral spring, the inner end of which is secured to the fixed axle of the casing ($a$), the outer end of which is secured to the barrel of the reel; ($b'$) represents, as shown in the drawings, a circular series of rods, which connect the heads of the reel, forming the barrel portion thereof; ($h'$) is the upper end of the wire, cord, or other material ($h$); ($h^2$), the lower end (as shown in Fig. 6).

The construction of the barrel of the reel may be modified, but the circular series of rods are preferred, as in case of insulated electric light wire being employed, the wire may be intertwined mid-way its length, that is to say, passed under one rod, thence upwardly over the next adjacent rod, as clearly shown in Fig. 2. By this means of attachment, the respective windings of the oppositely extending portions of the cable are more perfectly governed to effect a smooth distribution of the cable across the barrel and to each side of the so-called divisional strand. Furthermore, the cable may, in the manner suggested, be readily clamped to or held by the barrel without passing the cable entirely therearound and thus permit the cable to be extended a greater amount than is the case in devices heretofore used. When it is desired to wind or take up cord the lower portion ($h^2$) of the rope or cord is pulled down, thus releasing the ratchet ($e$) from engagement with the pawl ($f$), the tension of the spring ($i$) will cause the reel to revolve and both the upper portion and lower portion of the cord ($h$) to be wound upon the barrel of the reel, simultaneously, the reel rising as it takes up the cord.

A quick, continuous pull on the lower portion ($h^2$) of the cord ($h$) will unwind the cord from the reel, one end passing upwardly and the other downwardly, as shown in Figs. 1, 2, and 6, through the upper and lower guides ($c$) and ($d$), the reel then descending.

The unwinding of the cord from the reel places the spring ($i$) in tension, and the spring when in tension re-winds the cord upon the reel in both directions, upon the release of the pawl ($f$) from engagement with the ratchet ($e$).

The stops ($k$—$k$) are suitably secured to the cord or cords ($h$) in order to limit the winding of the material on the reel and to retain some tension in the spring ($i$).

With this description of my invention, what I claim is:—

A device of the type described comprising, in combination, a casing, a reel journaled within the casing having a barrel formed of a series of spaced parallel rods arranged circularly and concentrically about the journal whereby a cable to be wound may be primarily intertwined about certain of the rods to clamp the cable to the barrel and to form a divisional strand governing the respective windings of the oppositely extending cable-portions, and guide means disposed at the ends of the casing for yieldably holding the inclosed cable taut.

In testimony whereof I affix my signature in presence of two witnesses.

ALEXANDER NESBITT.

Witnesses:
JOHN F. KERR,
HERMAN A. FEIGELMAN.

Copies of this patent may be obtained for five cents each, by addressing the "Commissioner of Patents, Washington, D. C."